Jan. 19, 1965 W. LEONCHICK 3,166,744

DIGITAL READOUT DEVICE WITH BINARY TO DECIMAL CONVERSION

Filed Jan. 28, 1963 3 Sheets-Sheet 1

INVENTOR.
Walter Leonchick
BY
Leonard S Knox
Atty.

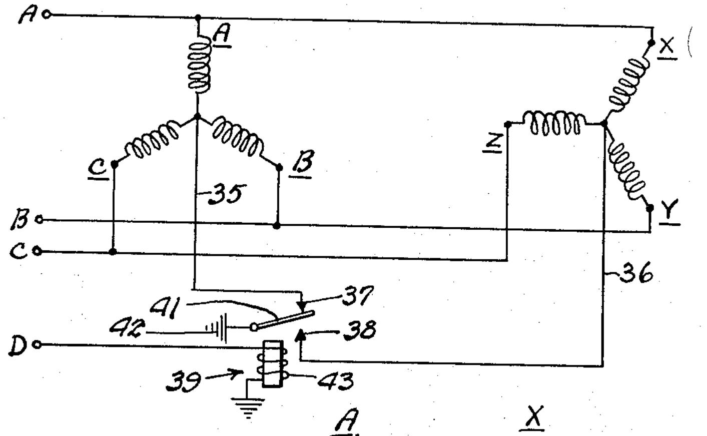
FIG. 4
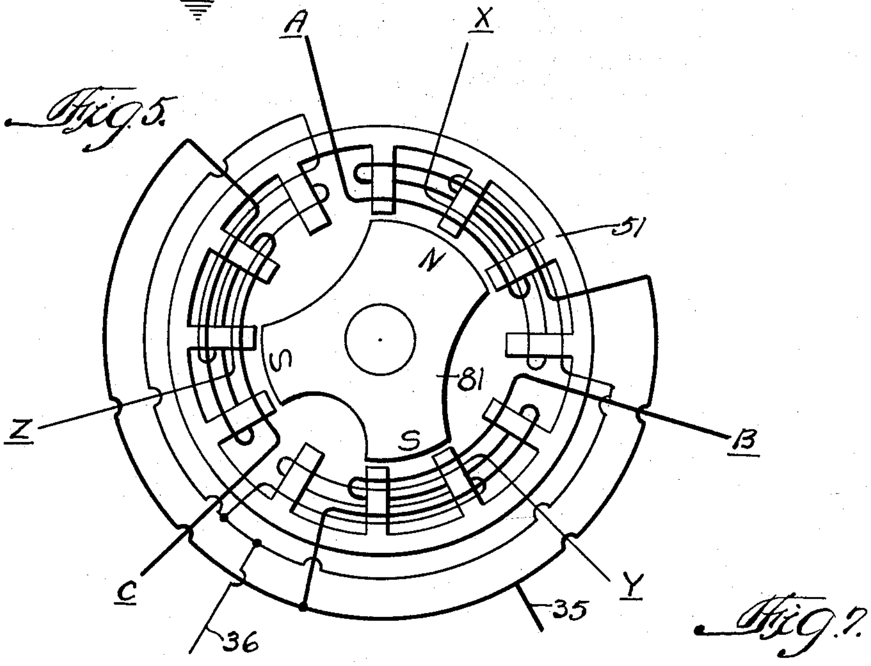
FIG. 5 FIG. 7
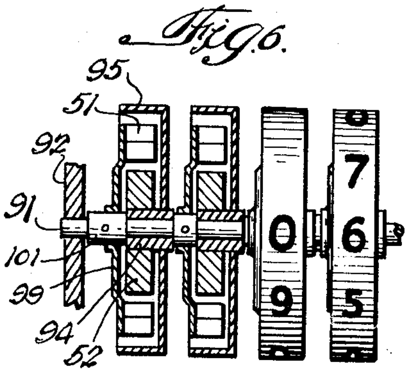
FIG. 6
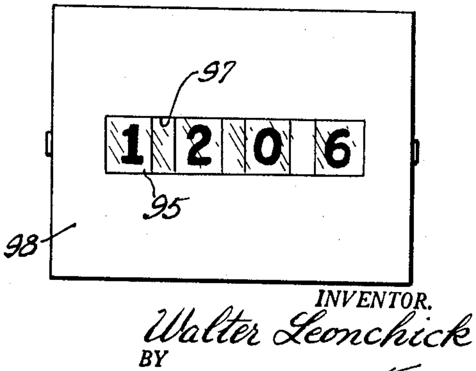
INVENTOR.
Walter Leonchick
BY
Leonard S. Knox
Atty.

DIGITAL READOUT DEVICE WITH BINARY TO DECIMAL CONVERSION

Filed Jan. 28, 1963 3 Sheets-Sheet 3

INVENTOR.
Walter Leonchick.
BY.
Leonard S. Knox
Atty.

United States Patent Office 3,166,744
Patented Jan. 19, 1965

3,166,744

DIGITAL READOUT DEVICE WITH BINARY TO DECIMAL CONVERSION

Walter Leonchick, 6961 Vine St., La Grange, Ill.

Filed Jan. 28, 1963, Ser. No. 256,188
4 Claims. (Cl. 340—347)

This invention relates to a system and a device forming a part thereof for converting electrical signals representing a number in the binary code into its equivalent in the decimal system.

This application is a continuation in part of my pending application Serial No. 831,962, filed August 6, 1959 now abandoned.

The invention finds application where binary-coded numbers in the form of oppositely identified electrical signals, described variously as "on-off," "energized—not-energized" "go—no go" or equivalent terminology. In any case it is well known that every number, expressed as a whole number or as a whole number plus a decimal fraction may be represented in the binary system by a pair of symbols expressed in a definite array. In addition, the instant invention avails itself of the principle of the binary-coded decimal. That is to say, a binary coded number is directly converted into a decimal number. This is done by represnting each digit in the decimal number by a 4-bit binary number as follows:

*Table I*

| Assigned 3-Bit Binary Code | | | Decimal Value or Drum Numbering | | |
|---|---|---|---|---|---|
| 4 | 2 | 1 | Binary | Decimal | Sum |
| 0 | 0 | 1 | 0+0+1 = | 0+0+1 = | 1 |
| 0 | 1 | 0 | 0+1+0 = | 0+2+0 = | 2 |
| 0 | 1 | 1 | 0+1+1 = | 0+2+1 = | 3 |
| 1 | 0 | 0 | 1+0+0 = | 4+0+0 = | 4 |
| 1 | 0 | 1 | 1+0+1 = | 4+0+1 = | 5 |
| 1 | 1 | 0 | 1+1+0 = | 4+2+0 = | 6 |

With three binary digits (commonly abbreviated to "bits") only eight combinations are possible ($2^3=8$). The selections not used in the above tabulation are "000" and "111."

In order to obtain six more numerals for readout, another column is necessay for a total of 4 bits. The additional column will consist of all 1's and will precede the above tabulation. Now if a weighted decimal value of "8" is assigned, the result is a pure binary code designated as the "8–4–2–1" code. The additional six numerals are obtained as follows:

*Table II*

| Assigned 4-Bit Binary Code | | | | Decimal Value or Drum Numbering | | |
|---|---|---|---|---|---|---|
| 8 | 4 | 2 | 1 | Binary | Decimal | Sum |
| 1 | 0 | 0 | 1 | 1+0+0+1 = | 8+0+0+1 = | 9 |
| 1 | 0 | 1 | 0 | 1+0+1+0 = | 8+0+2+0 = | 10 |
| 1 | 0 | 1 | 1 | 1+0+1+1 = | 8+0+2+1 = | 11 |
| 1 | 1 | 0 | 0 | 1+1+0+0 = | 8+4+0+0 = | 12 |
| 1 | 1 | 0 | 1 | 1+1+0+1 = | 8+4+0+1 = | 13 |
| 1 | 1 | 1 | 0 | 1+1+1+0 = | 8+4+2+0 = | 14 |

From the above, it is obvious that the combinations "1000" and "1111" were not used.

A weighted decimal value of "6" can just as easily be assigned to the first column of the four binary digits. Repeating the foregoing table and showing all the twelve numerals, we can sum up as follows:

*Table III*

| Assigned 4-Bit Binary Code | | | | Decimal Value or Drum Numbering |
|---|---|---|---|---|
| 6 | 4 | 2 | 1 | Binary Decimal Sum |
| 0 | 0 | 0 | 1 | 0+0+0+1=0+0+0+0= 1 |
| 0 | 0 | 1 | 0 | 0+0+1+0=0+0+2+0= 2 |
| 0 | 0 | 1 | 1 | 0+0+1+1=0+0+2+1= 3 |
| 0 | 1 | 0 | 0 | 0+1+0+0=0+4+0+0= 4 |
| 0 | 1 | 0 | 1 | 0+1+0+1=0+4+0+1= 5 |
| 0 | 1 | 1 | 0 | 0+1+1+0=0+4+2+0= 6 |
| 1 | 0 | 0 | 1 | 1+0+0+1=6+0+0+1= 7 |
| 1 | 0 | 1 | 0 | 1+0+1+0=6+0+2+0= 8 |
| 1 | 0 | 1 | 1 | 1+0+1+1=6+0+2+1= 9 |
| 1 | 1 | 0 | 0 | 1+1+0+0=6+4+0+0=10 or 0 |
| 1 | 1 | 0 | 1 | 1+1+0+1=6+4+0+1=11 |
| 1 | 1 | 1 | 0 | 1+1+1+0=6+4+2+0=12 |

One general application of the digital readout device as described herein is the direct readout of binary-coded decimal systems. Each digit in the decimal system is represented by a 4-bit binary number. For example:

| | | | |
|---|---|---|---|
| 1 | 0 0 0 1 | | |
| 10 | 0 0 0 1 | 1 1 0 0 | |
| 367 | 0 0 1 1 | 0 1 1 0 | 1 0 0 1 |

One method of translating a binary-coded decimal such as "367" into a decimal system is by means of lamps. In the following diagram $L_{on}$=lamp on="0" and $L_{off}$ =lamp off="1."

| | | | |
|---|---|---|---|
| 6○ | 6○ | 6● | ○ $L_{on}$ |
| 4○ | 4● | 4○ | ● $L_{off}$ |
| 2● | 2● | 2○ | |
| 1● | 1○ | 1● | |
| Sum: 3 | 6 | 7 | Decimal Equivalent |

Thus it has been shown that arbitrary decimal values can be assigned to each column of binary numbers, the required addition being performed mentally by the observer. The invention described herein performs this operation vectorially and presents the decimal equivalent to the observer pictorially on readout drums to be described.

Recapitulating, in the so-called 8421 arrangement zero and the first twelve numbers may be expressed as follows:

*Table IV*

| Decimal | Binary |
|---|---|
| 0 | 0000 |
| 1 | 0001 |
| 2 | 0010 |
| 3 | 0011 |
| 4 | 0100 |
| 5 | 0101 |
| 6 | 0110 |
| 7 | 0111 |
| 8 | 1000 |
| 9 | 1001 |
| 10 | 1010 |
| 11 | 1011 |
| 12 | 1100 |

Where each of the "1's" or "0's" represents the presence or absence of the base 2 raised to an integral power. Counting from the left in the second column the first 0 or 1 represents respectively 0 or $2^3(=8)$, the second 0 or 1 represents respectively 0 or $2^2(=4)$, the third 0 or 1 represents respectively 0 or $2^1(=2)$ and the fourth 0 or 1 represents respectively 0 or $2^0(=1)$. Hence the designation 8421. For example the numeral 10 equals $$2^3+0+2^1+0=8+0+2+0$$

The present invention has for its principal object the provision of a system including a readout device for receiving input signals representing a binary-coded number and for translating the same electro-mechanically into the corresponding decimal number as a display or other utilizable form, the device and circuitry being of an extremely simple character and capable of being embodied far more compactly than other decimal readout devices heretofore known.

Another object is to provide a device in accordance with the foregoing which may be embodied extremely compactly as a simple readout device or in larger proportions for applications where substantial power is required for positioning in response to the binary-coded signals.

The invention will be described in connection with a pure binary system (with weighted values of 8421 as above outlined), although larger numbers may be converted. Broadly regarded the invention, in one aspect, contemplates applying the binary-coded signals selectively to a wye-winding having its legs carried on three poles of a six pole stator 120° apart and, by means of the magnetic fields selectively established, causing an unwound, bi-polar, magnetic rotor to assume at least six angular positions.

Where, in the description and claims I employ the words "wye-winding" the same are not to be given the same meaning as in alternating current parlance, but in the sense of a circuit arrangement wherein three windings have one commonly connected end, the windings are selectively energized; and are not all simultaneously energized as in an alternating current circuit. Since the description and drawings are considerably simplified by showing the windings in the same manner as in alternating current circuits the language "wye-winding" represents the applicant's own lexicographical choice.

Although the foregoing arrangement is limited to the conversion of six numbers the principles thereof, in accordance with another aspect of the invention, are extended to a device capable of reproducing twelve numbers by utilizing a pair of wye-windings on a twelve pole stator and means for switching the input from one winding to the other. In either aspect the rotor, when employed, for example, for display of information, carries a drum upon the surface of which the numbers, either six or twelve, are rendered visible, as through a window. By utilizing any plurality of such stator-rotor assemblies, including an indicia-bearing drum individual thereto, any desired display may be obtained, e.g. a coaxial arrangement of stator-rotor assemblies would permit display of numbers of any magnitude or the assemblies may be arranged in any other preferred array. Among the possible applications are annunciator boards, computers, counters, digital voltmeters, ammeters, ohmmeters, equipment testers, machine tool control, programming, remote control apparatus, telemetering and manifold other applications wherein the furnished intelligence is in binary code or capable of translation thereinto, and such intelligence is to be utilized as decimal numbers or as positions which correspond to input in the decimal form.

In still another aspect the twelve pole stator may be employed with a bi-polar rotor in which one of the poles spans three poles of the stator and the opposite pole is bifurcated and each furcation spans a pair of stator poles, these pairs being separated by a single stator pole. By means of this embodiment more reliable positioning may be obtained, especially wherein the device is to deliver substantial torque.

In another alternative the device may be arranged to receive decimal information directly by interposing a suitable diode matrix.

The improvement of the invention, when used for binary to decimal conversion, replaces diode-matrices, relay trees, rotary solenoids, wafer switches and other more or less complicated presently available conversion systems.

The invention, in its several embodiments, is to be distinguished from those prior art devices of the "stepping" type wherein the rotor, when moving from one position to another, must pass through all of the intermediate positions successively and in the same direction, whereas in the invention devices, the rotor will move by the shortest path thus resulting in greatly accelerated speed of response.

When the invention is limited to the first six numerals (i.e. zero is excluded) binary coding may be accomplished on a 421 basis, i.e.

*Table V*

| Decimal | Binary |
|---|---|
| 1 | 001 |
| 2 | 010 |
| 3 | 011 |
| 4 | 100 |
| 5 | 101 |
| 6 | 110 |

In this case each of the "go" or "no go" signals, i.e. "0" or "1" as the case may be, is fed to an end of each of the three legs, i.e. coils of the wye-winding, the other ends thereof being in common to ground, to complete the input circuits. Thus the three input leads, when selectively energized in accordance with Table V, either singly or in pairs, are effective to position the rotor in any of six angular positions.

By utilizing a twelve pole stator and two wye-windings, together with a simple switching circuit twelve numerals may be decoded as will appear.

Other objects and advantages of the invention will appear from the ensuing description which taken with the accompanying drawings, discloses various embodiments of the invention.

In these drawings:

FIG. 4 is a circuit diagram to be correlated with FIG. 3.

Figures 1, 2, 3:
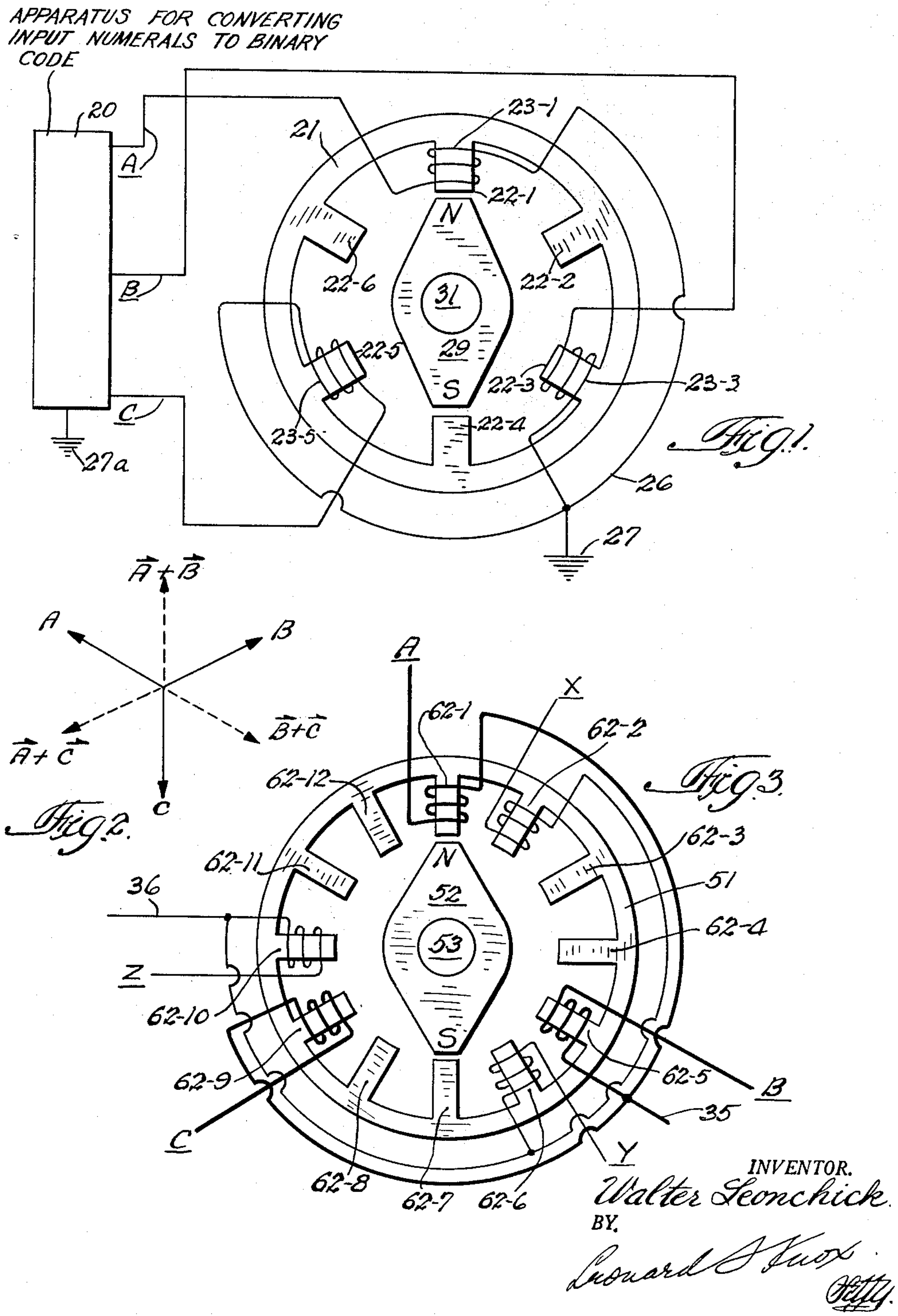
FIG. 1 is a schematic showing of a system and device in accordance with one aspect of the invention.
FIG. 2 is a vector diagram to be correlated with FIG. 1.
FIG. 3 is a schematic showing of a system and device in accordance with another aspect of the invention.
Figure 8:
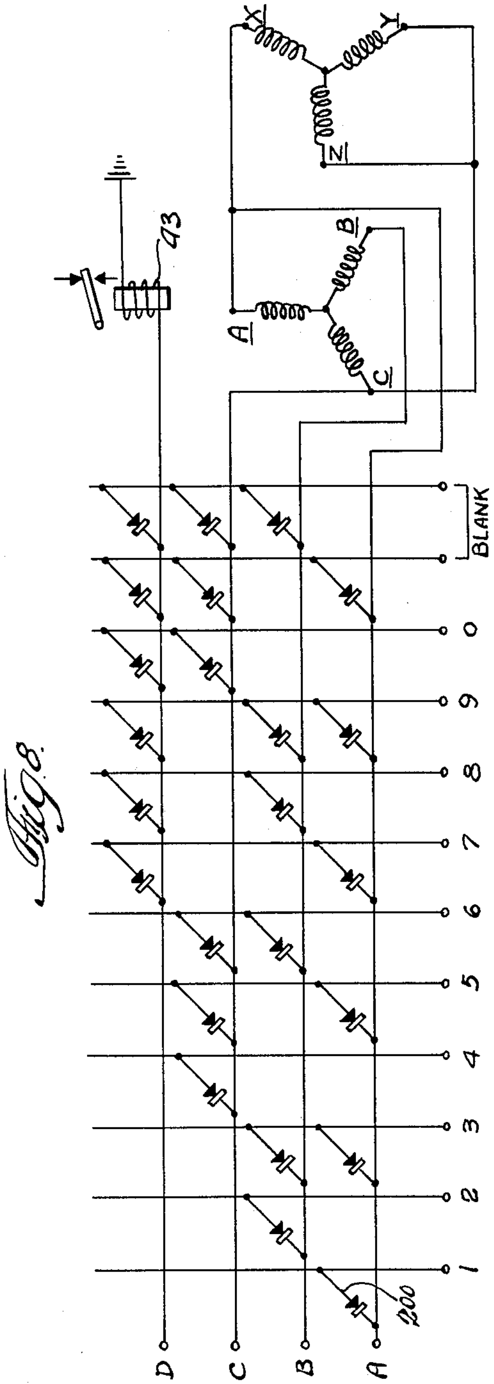
Figure 5A:
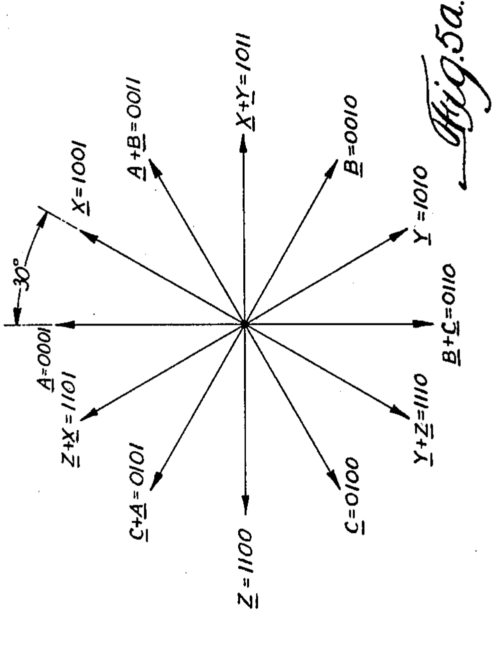
FIG. 5 is a schematic showing of another embodiment of the invention.

FIG. 5*a* is a vector diagram for those forms of the invention shown in FIGS. 3 and 5;

FIG. 6 is a front elevation showing the invention device embodied in practice;

FIG. 7 is an exterior front elevation of the device of FIG. 6 in a typical housing;

FIG. 8 is a diagram illustrating an arrangement for utilizing the invention device for operation from a set of signals in the decimal system.

Turning now to FIG. 1, I have shown, in block form, some form of apparatus and/or circuitry 20 from the output leads A, B and C of which are derived bits of information in binary code. Since such apparatus and/or circuitry may take an almost infinite variety of forms, many of which are well known, the same will not be elaborated upon beyond referring to "Digital Techniques for Computation and Control"; Klein, Morgan and Aronson; Instruments Publishing Co., Pittsburgh, Penna.; 1958, at page 153. In that article there is shown a commercial converter having a binary output which is designated: "Cyclic Binary Output to Data Handling Unit." Any three leads under the latter heading can be substituted for terminals "A," "B," and "C," of the block 20.

Further details will be found in "Remote Binary Control of Multiple Motors," W. Leonchick and J. Mech; ISA Journal, August 1961, vol. 8, No. 8, pp. 93, 97.

Assuming, for purposes of exposition, that the invention is limited to a readout device for the numerals from 1 to 6, inclusive, the bits of information will be available in triads in accordance with Table V above, and will be represented as "signal" or "no signal" or some equivalent oppositely identifiable pulses present at each of the output leads A, B and C. Thus Table V may be rewritten as follows:

*Table VI*

| Decimal System | Binary Leads C B A |
|---|---|
| 1 | 0 0 1 |
| 2 | 0 1 0 |
| 3 | 0 1 1 |
| 4 | 1 0 0 |
| 5 | 1 0 1 |
| 6 | 1 1 0 |

A fixed, annular stator 21 of magnetic material, solid, laminated, ferrite or other, having six equidistant poles 22–1 to 22–6, inclusive, is provided. Each alternate pole, 22–1, 22–3 and 22–5 has a leg 23–1, 23–3 and 23–5 of a wye-winding associated therewith, e.g. by winding the same around the pole. One end of each of the legs is connected in common by a bus 26 to ground at 27. A bi-polar rotor 29 of permanent magnet material is supported for rotation on the axis 31 of the stator to assume any of six angular positions. Although the stator has been described as fixed and the rotor as rotatable it will be understood that these functions may be reversed since relative rotation is intended. Obviously, if it is advantageous to fix the "rotor" and to render the "stator" rotatable, slip rings and brushes will be required.

Assuming an output signal 001 appearing between lead A and ground, and assuming the direction of coil 23–1 and current flow therein are such as to make pole 22–1 a south pole, the rotor 29 will take up the position shown, with its N pole aligned with the pole 22–1. This position of the rotor will correspond to the numeral 1. A numbered drum secured to the shaft 31 will then occupy a corresponding position. Similarly with respect to the signals 011 and 101 for the numerals 3 and 5. For the signals 010, 100 and 110 the respective pairs of coils 23–1, 23–3; 23–3, 23–5 and 23–5, 23–1 will be energized (Table VI) whereupon the N pole of the rotor will occupy its intermediate positions opposite the poles 22–2, 22–4 or 22–6, as the case may be, to establish the corresponding positions of the drum. Reference to the vector diagram of FIG. 2 further illustrates the function just described wherein, for convenience, the vector current in the stator coils is identified by the letters A, B and C.

It will have become apparent that, beginning with winding 23–1 and moving clockwise the corresponding numerals will appear sequentially on the drum as 1, 3, 2, 6, 4, 5.

Examining the pure 8421 binary code with 4 bits of information where a possibility of 16 combinations is available we can choose 12 working groups as follows:

*Table VI*

| Decimal | Binary (8 4 2 1) | Decimal | Binary (8 4 2 1) |
|---|---|---|---|
| 0 | 0 0 0 0 | 8 | 1 0 0 0 |
| 1 | 0 0 0 1 | 9 | 1 0 0 1 |
| 2 | 0 0 1 0 | 10 | 1 0 1 0 |
| 3 | 0 0 1 1 | 11 | 1 0 1 1 |
| 4 | 0 1 0 0 | 12 | 1 1 0 0 |
| 5 | 0 1 0 1 | 13 | 1 1 0 1 |
| 6 | 0 1 1 0 | 14 | 1 1 1 0 |
| 7 | 0 1 1 1 | 15 | 1 1 1 1 |

It will be observed that numerals 8 to 15 require an additional or first column (component "8"), and that numerals 9 to 14 follow the same pattern as numerals 1 to 6 (components "4," "2," "1") if the first column (component "8") is eliminated. That is numeral 9 equals 8 plus 1, numeral 10 equals 8 plus 2, etc.

Having in mind a block such as 20 and a binary output of four bits represented as output leads A, B, C and D the foregoing concept may be carried into the conversion of the numbers from 1 to 12, as follows:

*Table VIII*

| Decimal System | Binary Leads D C B A | Optional Drum Numbering |
|---|---|---|
| 1 | 0 0 1 | 1 |
| 2 | 0 1 0 | 2 |
| 3 | 0 1 1 | 3 |
| 4 | 1 0 0 | 4 |
| 5 | 1 0 1 | 5 |
| 6 | 1 1 0 | 6 |
| 7 | – | – |
| 8 | – | – |
| 9 | 1 0 0 1 | 6 + 1 = 7 |
| 10 | 1 0 1 0 | 6 + 2 = 8 |
| 11 | 1 0 1 1 | 6 + 3 = 9 |
| 12 | 1 1 0 0 | 6 + 4 = 10 or 0 |

It will be noted that the binary information for the numerals 7, 8, 9 and 0 are not availed of directly but are first converted to or obtained as bits corresponding to 9, 10, 11 and 12 respectively. This is done for the purpose of selecting binary-coded combinations that may be added vectorially. As has been pointed out hereinbefore the numerals 1 to 6 are added by means of vectors. This process is repeated for the numerals 6 to 12 by the insertion of a constant having a weighted value of 6 which may be employed in substitution of component "8" in Table VIII, above. Further reference is made to Digital Computor Components and Circuits; R. K. Richards; D. Van Nostrand Co., Inc., New York; 1957–1958; pp. 398–399.

Adverting now to FIG. 4, I have shown a pair of wye-windings identified as ABC and XYZ, each of which corresponds to the wye-winding of FIG. 1. Each winding is displaced 30° from the other and these are connected in parallel A to X, B to Y and C to Z; the buses corresponding to the input leads A, B, and C of FIG. 1. The common end of each of the sets of coils is connected by conductors 35 and 36 to the back and front contacts 37 and 38 of a relay 39. Armature 41 thereof is connected to ground at 42, and the winding 43 to ground and a fourth input lead D. These leads, A, B, C and D are to be read in connection with Table VIII.

Referring to FIG. 3 there is shown a stator 51 and rotor 52 characterized as in FIG. 1 except that here there are twelve poles 62–1, etc. The poles 62–1, 62–5, 62–9 carry the legs identified now, for convenience, as A, B and C whereas the poles 62–2, 62–6 and 62–10 carry the coils similarly identified as X, Y and Z. It will be observed that the legs of the winding ABC are 120° apart and that these, as an entity, are shifted 30° with respect to the legs of the winding XYZ.

From FIGS. 3 and 4 and, assuming no signal on lead D (Table VIII), it will be seen that the armature 41 will place ground on winding ABC and that this winding will function as in FIG. 1 to decode the binary numbers 1 to 6 into the equivalent decimal numbers. When the sets of signals corresponding to 9 to 14 (equivalent to 7, 8, 9, 0 and double blank) are applied D is also energized, the relay armature will remove ground from winding ABC and apply it to winding XYZ whereupon the rotor 52 will take up six additional positions shifted 30° from those resulting from the use of winding ABC and the drum will be rotated to the additional six presentations. Obviously the vector diagram of FIG. 2 will apply also to the winding XYZ subject to a shift of 30°. For a specific example, the decimal number 4 will be converted by signals applied to coils X and Y corresponding to signals on leads A, B and D. Beginning with pole 62–1 and moving clockwise the corresponding numerals will appear sequentially on the drum in the order 1, 7, 3, 9, 2, 8, 6, 12 or blank, 4, 10 or 0, 5, 11 or blank. In accordance with known practice the electro-mechanical relay 39 and its pertinent circuitry and function may comprise a thermionic tube, a transistor or other switching medium.

The vector diagram for FIG. 3 will be similar to FIG. 2 except that another diagram exactly the same will be superimposed thereupon with all six vectors shifted 30° in phase. Such displacement follows from the equal pole displacement in FIG. 3. FIG. 5*a* illustrates the vector diagram for both FIG. 3 and also for FIG. 5 to be described subsequently.

The leads A, B, C, and D of FIG. 4 can be replaced by any commercial converter having a binary-coded decimal output as described previously. For example, the simplified versions of the three-relay matrix shown on page 172 of Klein et al., supra can be eliminated by three digital readout assemblies (four being shown in FIG. 6).

For greater torque and reliability of register of the numerals in the window of the readout device the embodiment of FIG. 5 is preferred. Basically this arrangement is functionally the same as that of FIG. 3 except that each leg of the winding spans three poles of the stator and the shift in the pair of wye-windings is still 30°. In this embodiment the rotor 81 takes substantially the form illustrated with a single N pole and bifurcate (or a pair) of S poles. It will be observed that the N pole spans three teeth and that each S pole furcation spans two teeth, each of which pairs is separated by a single tooth. With this arrangement one obtains greater electromagnetic flux without saturation of the stator. A rotor of this character is functionally equivalent to a pair of rotors as in FIG. 1 and is cooperative with the greater flux available from the triads of teeth over which the coils are wound. Moreover since, as a practical matter, it is virtually impossible to obtain identical flux between the single N pole and the compound S pole the rotor will be asymmetrical, thereby avoiding the possibility of a stalled condition which might arise from exactly symmetrical flux fields when making 180° reversals of the rotor assembly. In effect the flux is distributed over a greater area thus minimizing the reluctance of the magnetic circuit.

A complete electro-mechanical assembly of a device embodying the principles of the invention is shown in FIGS. 6 and 7.

A fixed shaft 91 is carried in brackets 92 (one only of which is depicted). Each of the several rotors, say 52, is secured to a bushing 94 rotatable on the shaft and the bushing also has secured thereto a drum 95 bearing each of the numerals 1 to 9 and 0 on its periphery for presentation in the window 97 of the front panel 98 of a suitable housing. It will be understood that there will be as many stator-rotor combinations as there are decimal numbers to be read out. In the example four are shown. If a decimal point is employed the same will be fixed in any suitable manner in or adjacent a window.

Each of the stators, say 51, is carried on a suitable spider 99 having a hub 101 which is fixed to the shaft 91. By nesting the stator and rotor within the drum an axially-compact assembly is readily obtained. Each stator will be connected to a set of leads A, B, C, D for individual conversion of the bits of information fed thereto.

By fabricating the stator-rotor assembly to the required dimensions the same can be used for driving some mechanism other than a light weight indicia-bearing drum in response to a D.C. input. Thus the same may be employed for remote control, telemetering and other applications where substantial torque is required. By utilizing such units having higher torque, amplifiers in D.C. servo systems may be eliminated.

The invention has limitless other applications wherein decimal pictorial presentation is required, such as annunciator boards, counters, digital voltmeters, ammeters and ohmmeters, etc. Words and letters may be substituted for the numerals such as "OFF," "ON," "VOLTS," "AMPERES," etc. In these and similar applications the invention results in substantial decrease in cabling as only four leads are necessary for a 12-position readout device as compared to other arrangements wherein 12 conductors constitutes the minimum.

By employing a stator having the necessary plurality of teeth and windings a readout device may be realized for greater than twelve positions. Each winding will be shifted angularly with respect to its preceding winding, regarded phase-wise, and suitable switching means employed for transferring the binary code positions from winding to winding. For example a binary code identified as 16–8–4–2–1 will require a third wye-winding with means to switch from one winding to the other depending upon the "16" or "8" component of the code.

In those cases wherein a set of signals coded in the decimal system is available the invention is readily adaptable by the use of a diode matrix. Referring to FIG. 8, wherein certain reference letters and numerals have the same significance as in FIG. 4, there is shown a plurality of buses 1 to 0 and Blank, upon which are impressed signals representing decimal-coded numbers. These buses are connected to the relay and the two wye-windings ABC and XYZ as shown. The buses A, B, C, D, and 1 to 0 and Blank are interconnected by diodes such as 200 to form the matrix as shown. Referring to Table VIII and tracing the paths of forward conduction through the diodes it will be seen that the matrix converts the decimal coded signals to the binary system for operation of the invention device, e.g. as embodied in FIG. 3. For example, selecting the numeral 6 (0110)(—CB—) a current path may be traced from terminal 6 through two diodes 200 to buses C and B.

While I have shown particular embodiments of my invention, it will be understood, of course, that I do not wish to be limited thereto since many modifications may be made and I, therefore, contemplate by the appended claims to cover any such modifications as fall within the true spirit and scope of my invention.

I claim:

1. Apparatus for reading out numbers coded as opposite current states as their decimal equivalent, comprising: a device to convert the numbers to an output comprising binary code signals expressed as components $2^n$, $2^{n-1}$, $2^{n-2}$ . . . $2^0$, said output including common ground and a plurality of conductors constituting circuits upon which the binary code signals appear, the number of said conductors being equal to the total number of "0's" and "1's" required to represent the highest decimal number to be converted, an annular stator having an even plurality of $n$ equi-angularly spaced poles, a first wye-winding, each leg of which is wound around a triad of adjacent ones of said poles, the number of triads being $n/3$ and the triads being equi-angularly spaced poles, a first wye-winding, each leg of which is wound around a triad of adjacent ones of said poles, the number of triads being $n/3$ and the triads being equi-angularly spaced about the stator, succeeding sets of wye-windings, the legs of which are wound on other triads of poles, the windings of each set being overlapped on two adjacent poles of each first mentioned triad, one end of each leg of each winding being connected in common and to individual first leads, the other end of each leg being connected in parallel with the other end of each leg nearest the same in an angular sense to provide second common leads, second common leads being respectively connected to said conductors to receive the signals for $2^{n-1}$ . . . $2^0$, means for switching from one wye-winding to another in response to the signal representing a weighting component, a rotatable shaft coaxial with said stator, a bi-polar rotor supported on said shaft for rotation with respect to the stator poles to take up a plurality of angular positions corresponding to the flux pattern of the windings then energized, one end of the rotor being bifurcated to divide the pole thereat into a pair of distinct poles of the same polarity, and the other end of the rotor being a single pole symmetrical about a diameter with said pair of poles, the outer face of each furcation spanning a pair of stator poles and said last pair of poles being separated by a single stator pole, and means mounted on said shaft to read out the plurality of angular positions of the rotor.

2. Apparatus for reading out numbers coded as opposite current states as their decimal equivalent comprising: a device to convert the numbers to an output comprising binary code signals expressed as components $2^3$, $2^2$, $2^1$, $2^0$, said output including common ground and four conductors constituting circuits upon which the binary code signals appear, an annular stator having 12 poles, a first wye-winding, each leg of which is wound around a triad of adjacent ones of said poles, a second wye-winding, each leg of which is wound around a triad of adjacent ones of said poles, said last mentioned triads being shifted circumferentially by one pole whereby the respective legs of the windings overlap on pairs of poles, one end of each leg of the overlapped windings being connected in common, means for switching either of said common connections to the conductor carrying the signal for $2^2$, the other end of each leg being connected in parallel with the other end of each leg nearest the same in an angular sense to provide second common leads, said second common leads being respectively connected to the remaining three of said four conductors to receive the signals for $2^2$, $2^1$, $2^0$, a rotatable shaft coaxial with said stator, a bi-polar rotor supported on said shaft for rotation with respect to the stator poles to take up a plurality of angular positions corresponding to the flux pattern of the windings then energized, one end of the rotor being bifurcated to divide the pole thereat into a pair of distinct poles of the same polarity, and the other end of the rotor being a single pole symmetrical about a diameter with said pair of poles, the outer face of each furcation spanning a pair of stator poles and said last pair of poles being separated by a single stator pole, and means mounted on said shaft to read out the plurality of angular positions of the rotor.

3. Apparatus for reading out electrical signals representing numbers coded as opposite current states as individual angular positions about a central axis comprising: a device to receive said signals and to convert the same into an output of $2^2$, $2^1$, $2^0$ plus a weighting component, said output including ground and four leads constituting circuits upon which each of the components appear as electrical signals, an annular stator of magnetizable material having twelve equi-angularly spaced poles, a pair of wye-windings, the three legs of one member of the pair being respectively wound on groups of three stator poles, the three groups being 120° apart, the legs of the other member of the pair being respectively wound on groups of three stator poles, the three groups also being 120° apart but shifted 30° from the groups of poles associated with the said one member whereby said legs overlap on two adjacent poles, one end of each leg of the overlapped windings being connected in common to provide three leads, said leads being connected to the output leads for $2^2$, $2^1$, $2^0$, a relay having a front and a back contact, the armature thereof being connected to ground, the other end of each leg of each winding being connected to provide two common points, the respective said common points being connected to the front contact and back contact respectively, one side of the operating winding of the relay being connected to the conductor carrying the weighting component, the other side of the relay winding being connected to ground whereby a "signal" or "no signal" on the weighted component lead is effective to switch operation from one wye-winding to the other, a rotatable shaft coaxial with said stator, a magnetic rotor carried on said shaft for rotation with respect to the stator and cooperative with the flux generated by the then-energized wye-winding and relay position to take up any of twelve positions, and means for utilizing the intelligence represented by the plurality of angular positions of the rotor.

4. Apparatus for reading out the numerals 1, 2 . . . 0 from binary coded versions of said numerals where the numerals from 1 to 6 are represented as 0, $2^2$, $2^1$, $2^0$ and the numerals from 7 to 0 as $2^3$, $2^2$, $2^1$, $2^0$ or as a weighting factor in the first position and $2^2$, $2^1$, $2^0$ comprising a device providing an output of said numerals in said binary coded form, said output being applied to four conductors and common ground, there being one individual to each of the four binary components, an annular stator having twelve poles, two wye-windings, the legs of one winding being each wound on a first group of three adjacent poles, the legs of the other winding being each wound on a second group of three adjacent poles two of which are included in the poles of the first group whereby the legs of said other winding overlap the legs of said first winding by the amount of two poles, a relay having an armature and front and back contacts, the common end of each winding being connected to said front and back contacts respectively, said armature being connected to ground, the conductor corresponding to the first component of the four-bit binary code being connected to the winding of the relay, the other end of said relay winding being connected to ground whereby signal or no-signal applied to the relay winding is effective to connect the common end of the one wye-winding or the other to said first component conductor, the other ends of the overlapped legs of the wye-windings being connected in common and to each of the remaining three conductors, a rotatable shaft coaxial with the stator, a bi-polar magnetic rotor mounted on said shaft, said rotor having one magnetic pole spanning three stator poles and a diametrically opposite magnetic pole comprised as two separate parts, each part spanning two stator poles and the two stator poles associated with each part being separated by one stator pole, and means for utilizing the angular positions of the rotor resulting from selective energization of the wye-windings as a decimal number readout.

References Cited by the Examiner

UNITED STATES PATENTS

| | | | |
|---|---|---|---|
| 2,827,626 | 3/58 | De Motte | 340—347 |
| 2,941,136 | 6/60 | Marantette et al. | 310—49 |
| 3,004,251 | 10/61 | Rapacz | 340—347 |

MALCOLM A. MORRISON, *Primary Examiner.*

DARYL W. COOK, *Examiner.*

UNITED STATES PATENT OFFICE
CERTIFICATE OF CORRECTION

Patent No. 3,166,744 January 19, 1965

Walter Leonchick

It is hereby certified that error appears in the above numbered patent requiring correction and that the said Letters Patent should read as corrected below.

Column 5, line 57, the centered heading above the table, for "Table VI" read -- Table VII --; column 8, lines 51 to 54, strike out "poles, a first wye-winding, each leg of which is wound around a triad of adjacent ones of said poles, the number of triads being n/3 and the triads being equiangularly spaced"; column 9, line 20, for "$2^2$" read -- $2^3$ --.

Signed and sealed this 1st day of June 1965.

(SEAL)
Attest:

ERNEST W. SWIDER
Attesting Officer

EDWARD J. BRENNER
Commissioner of Patents